(12) United States Patent
Kim et al.

(10) Patent No.: US 10,190,931 B2
(45) Date of Patent: Jan. 29, 2019

(54) DIFFERENTIAL PRESSURE SENSOR

(71) Applicant: COMETNETWORK CO., LTD., Busan (KR)

(72) Inventors: Sang Joo Kim, Seongnam-si (KR); Min Soo Kim, Yongin-si (KR); Jung Min Kim, Seongnam-si (KR); Sang Bin Lee, Suwon-si (KR); Hwan Park, Seoul (KR)

(73) Assignee: COMETNETWORK CO., LTD., Busan (KR)

( * ) Notice: Subject to any disclaimer, the term of this patent is extended or adjusted under 35 U.S.C. 154(b) by 56 days.

(21) Appl. No.: 15/508,403

(22) PCT Filed: Sep. 3, 2014

(86) PCT No.: PCT/KR2014/008222
§ 371 (c)(1),
(2) Date: Apr. 14, 2017

(87) PCT Pub. No.: WO2016/035903
PCT Pub. Date: Mar. 10, 2016

(65) Prior Publication Data
US 2017/0284884 A1    Oct. 5, 2017

(51) Int. Cl.
*G01L 13/02* (2006.01)
*G01L 13/06* (2006.01)
(Continued)

(52) U.S. Cl.
CPC .............. *G01L 13/06* (2013.01); *F01N 13/08* (2013.01); *G01L 13/00* (2013.01); *G01L 13/025* (2013.01);
(Continued)

(58) Field of Classification Search
CPC ....... G01L 13/025; G01L 13/06; G01L 19/14; F01N 11/002
See application file for complete search history.

(56) References Cited

U.S. PATENT DOCUMENTS 3,808,480 A * 4/1974 Johnston ................. C01B 17/60
361/283.4
3,880,009 A * 4/1975 Johnston ............... G01L 9/0072
73/724
(Continued)

FOREIGN PATENT DOCUMENTS

JP    2000-346737 A    12/2000
JP    2010-145341 A    7/2010
(Continued)

*Primary Examiner* — David Bolduc
(74) *Attorney, Agent, or Firm* — Novick, Kim & Lee, PLLC; Jae Youn Kim

(57) ABSTRACT

Provided is a differential pressure sensor which includes: a housing including a body and a cover, the housing having a first chamber and a second chamber defined in the housing and separated from each other; a first pressure channel communicating with the first chamber; a second pressure channel communicating with the second chamber; and a substrate on which an electronic component is mounted and in which a terminal is formed, the substrate including a first surface facing the first chamber and a second surface extending parallel to the first surface and facing the second chamber, the substrate configured to cover the second chamber.

7 Claims, 6 Drawing Sheets

(51) Int. Cl.
    *F01N 13/08*           (2010.01)
    *G01L 13/00*           (2006.01)
    *G01L 19/14*           (2006.01)
    *F01N 11/00*           (2006.01)
    *F01N 13/18*           (2010.01)

(52) U.S. Cl.
    CPC ............ *G01L 19/14* (2013.01); *F01N 11/002* (2013.01); *F01N 13/18* (2013.01); *F01N 2560/08* (2013.01)

(56) References Cited

U.S. PATENT DOCUMENTS

| | | | | |
|---|---|---|---|---|
| 4,895,026 | A * | 1/1990 | Tada | G01L 9/06 |
| | | | | 338/4 |
| 5,079,953 | A * | 1/1992 | Martin | G01L 19/14 |
| | | | | 361/283.4 |
| 5,969,591 | A * | 10/1999 | Fung | G01L 9/0042 |
| | | | | 338/4 |
| 6,272,928 | B1 * | 8/2001 | Kurtz | G01L 9/0055 |
| | | | | 73/721 |
| 2011/0088480 | A1 | 4/2011 | Koehler et al. | |
| 2015/0268115 | A1 * | 9/2015 | Robert | B81B 3/0021 |
| | | | | 73/718 |
| 2016/0334292 | A1 * | 11/2016 | Oono | G01L 9/00 |

FOREIGN PATENT DOCUMENTS

| | | |
|---|---|---|
| KR | 10-2013-0018570 A | 2/2013 |
| KR | 10-1486518 B1 | 1/2015 |
| WO | 2007-015435 A1 | 2/2007 |

\* cited by examiner (a)

(b)

DIFFERENTIAL PRESSURE SENSOR

TECHNICAL FIELD

The present invention relates to a differential pressure sensor used for an exhaust system post-treatment device of or the like.

BACKGROUND ART

In an exhaust system for a motor vehicle, there are installed an exhaust system post-treatment device for physically collecting particulate materials from an exhaust gas and burning the particulate materials to remove the same and a low-pressure exhaust gas recirculation cooler (LP EGR cooler) for cooling an exhaust gas. Furthermore, there is installed a differential pressure sensor for measuring a pressure difference between the front end and the rear end of the exhaust system post-treatment device and the low-pressure exhaust gas recirculation cooler. If an abnormality occurs in the exhaust system post-treatment device or the low-pressure exhaust gas recirculation cooler, the pressure difference measured by the differential pressure sensor increases.

Korean Patent No. 1011098 discloses a differential pressure sensor provided with a housing that includes a first housing chamber, a second housing chamber and a third housing chamber. A first sealing member seals the third housing chamber with respect to the first housing chamber. A second sealing member disposed in a region where a first housing part as a body of a housing and a second housing part as a cover make contact with each other seals the first housing chamber from the second housing chamber.

In the differential pressure sensor, the second sealing member seals the housing from the outside and seals the first housing chamber having a sensor element with respect to the second housing chamber, thereby reducing the bonding process.

Furthermore, Korean Patent Application Publication No. 2013-0018570 discloses a sensor system that includes an electronic module assembly provided with a sensing element carrier element having a sensing element and an electronic module carrier element on which electronic components are mounted, and a housing assembly configured to accommodate the electronic module assembly. An electric connection part is provided between the sensing element carrier element and the electronic module carrier element.

In addition, Korean Patent Application Publication No. 2012-0062363 discloses a differential pressure sensor that includes a filter as a means for protecting a sensor chip from an exhaust gas.

PRIOR ART DOCUMENTS

Patent Documents

Korean Patent Application Publication No. 2013-0018570
Korean Patent Application Publication No. 2012-0062363
Korean Patent No. 1011098

SUMMARY

The present invention provides an improved differential pressure sensor of a novel structure different from the conventional differential pressure sensors.

According to one embodiment of the present invention, there is provided a differential pressure sensor, including: a housing including a body and a cover, the housing having a first chamber and a second chamber defined in the housing and separated from each other; a first pressure channel communicating with the first chamber; a second pressure channel communicating with the second chamber; a substrate on which an electronic component is mounted and on which a terminal is formed, the substrate including a first surface facing the first chamber and a second surface parallel to the first surface and facing the second chamber, the substrate configured to cover the second chamber; a sensor element installed on the first surface of the substrate so as to generate an electric signal corresponding to a pressure difference between the first chamber and the second chamber; a lead frame installed in the housing with one end thereof extending into the first chamber, the lead frame configured to transmit the electric signal of the sensor element to an external device; a conductive wire configured to connect the terminal of the substrate and the lead frame so as to transmit the electric signal of the sensor element to the lead frame; a first sealing member disposed in a region where the body and the cover make contact with each other, the first sealing member configured to seal the first chamber with respect to the outside; and a second sealing member disposed in a region where the substrate and the body make contact with each other, the second sealing member configured to seal the second chamber with respect to the first chamber.

The sensor may preferably further include: a filler configured to surround the electronic component and the terminal of the substrate and the conductive wire so as to protect the electronic component and the terminal of the substrate and the conductive wire. The filler may have a gel state.

The sensor may further include: a barrier disposed between the sensor element and the terminal, the barrier protruding from the substrate toward the cover, the filler coated on a region surrounded by the barrier and an inner wall of the housing.

The electronic component may include a multilayer ceramic capacitor, and the conductive wire may be an aluminum wire.

The sensor substrate may preferably be a ceramic substrate.

The lead frame may include a first lead frame, a second lead frame and a third lead frame electrically separated from each other, and one end portion of the second lead frame and one end portion of the third lead frame may at least partially overlap with each other.

The differential pressure sensor according to the present invention has an advantage in that the differential pressure sensor is easy to assemble and is simple in structure.

DETAILED DESCRIPTION

A preferred embodiment of the present invention will now be described with reference to the accompanying drawings.

The embodiment to be described below is presented by way of example in order to make sure that the idea of the present invention is sufficiently delivered to those skilled in the art. Accordingly, the present invention is not limited to the embodiment described below and may be embodied in other forms.

Figure 1:
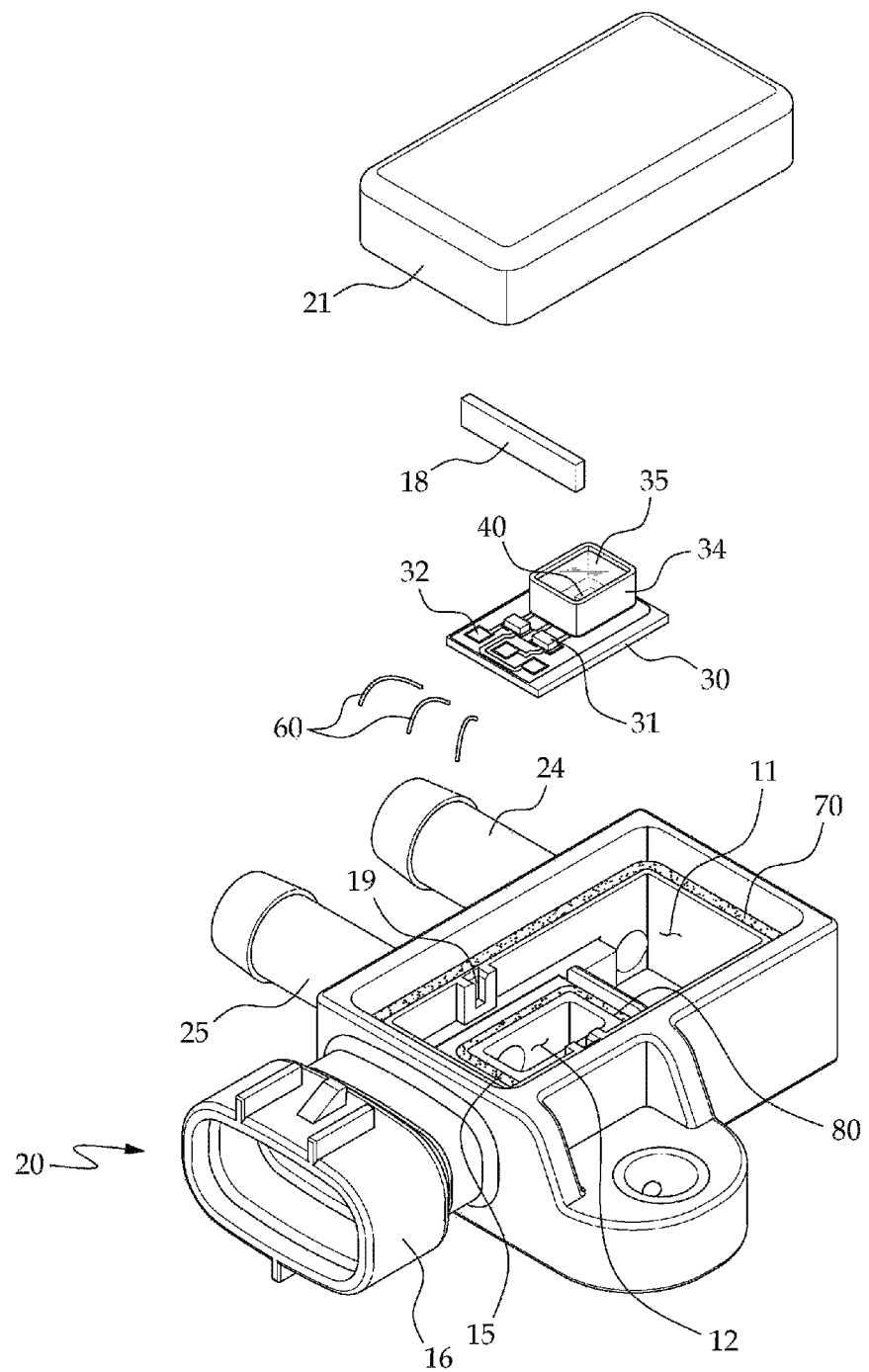
FIG. 1 is an exploded perspective view showing a differential pressure sensor according to one embodiment of the present invention.
Figure 2:
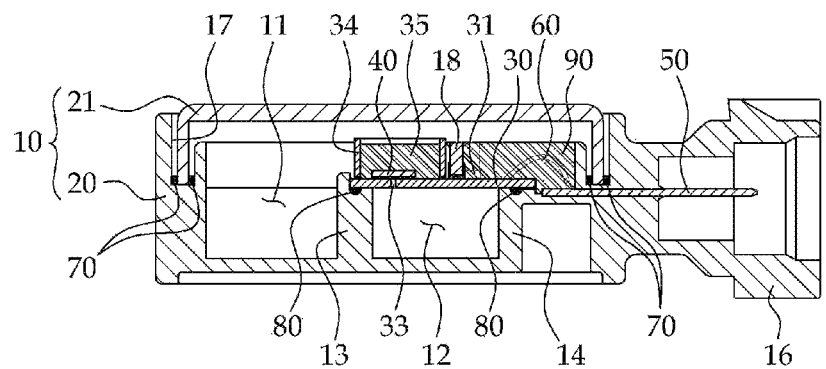
FIG. 2 is a sectional view of the differential pressure sensor shown in FIG. 1.

FIG. 1 is an exploded perspective view showing a differential pressure sensor according to one embodiment of the present invention. FIG. 2 is a sectional view of the differential pressure sensor shown in FIG. 1. Referring to FIGS. 1 and 2, the differential pressure sensor according to one embodiment of the present invention includes a housing 10, a first pressure channel 24, a second pressure channel 25, a substrate 30, a sensor element 40, lead frames 50, a first sealing member 70, a second sealing member 80 and a filler 90.

The housing 10 includes a body 20 and a cover 21. The cover 21 is fitted to the body 20 and serves to seal an open upper end of the body 20 from the outside. A first chamber 11 and a second chamber 12 are formed inside the housing 10. The second chamber 12 is separated from the first chamber 11 by a partition wall 13 formed in the central portion of the body 20. A support portion 14 is formed on the right side of the second chamber 12 in FIG. 2. The first pressure channel 24 and the second pressure channel 25, which have a nozzle shape, are coupled side by side to one side portion of the body 20. For example, the first pressure channel 24 may be connected to the front end of the exhaust system post-treatment device, and the second pressure channel 25 may be connected to the rear end of the exhaust system post-treatment device. The first chamber 11 communicates with the first pressure channel 24, and the second chamber 12 communicates with the second pressure channel 25. Thus, by measuring a differential pressure between the first chamber 11 and the second chamber 12, it is possible to measure a differential pressure between the front end and the rear end of the exhaust system post-treatment device.

The substrate 30 is disposed inside the body 20 so as to cover the second chamber 12. The substrate 30 is supported by the partition wall 13 and the support portion 14. A sensor element 40, electronic components 31 such as a multilayer ceramic capacitor and the like, terminals 32, etc. are installed on the substrate 30. Since a high-temperature exhaust gas is introduced into the housing 10, it is preferred that the substrate 30 is a ceramic substrate. The substrate 30 serves not only to support the sensor element 40 but also to seal the second chamber 12 with respect to the first chamber 11 together with the second sealing member 80

An opening 33 is formed in the substrate 30. The sensor element 40 is installed in the region where the opening 33 is formed. The opening 33 is configured to deliver the pressure of the second chamber 12 to the lower portion of the sensor element 40. A sensor element barrier 34 having a rectangular frame shape is disposed around the sensor element 40. A gel 35 for protecting the sensor element 40 from harmful substances in the exhaust gas may be filled in the sensor element barrier 34. The gel 35 may be a fluoro silicone gel.

The sensor element 40 may include, for example, a silicon-based semiconductor pressure sensor provided with a pressure-sensitive membrane. The pressure of the second chamber 12 is delivered to the lower portion of the sensor element 40 via the opening 33 of the substrate 30. The pressure of the first chamber 11 is delivered to the upper portion of the sensor element 40 via the gel 35. The sensor element 40 generates an electric signal corresponding to a pressure difference between the upper portion and the lower portion of the sensor element 40. The electric signal is transmitted to the terminals 32 of the substrate 30 via the wiring lines formed on the substrate 30 and the electronic components 31.

A connector portion 16 to be coupled to an external device is formed on the right side of the body 20. The lead frames 50 are installed in the connector portion 16. One end portions of the lead frames 50 extend into the housing 10. The other end portions of the lead frames 50 extend to the outside of the housing 10. One end portions of the lead frames 50 extending into the housing 10 are electrically connected to the terminals 32 of the substrate 30 by conductive wires 60. The conductive wires 60 are connected to the lead frames 50 and the terminals 32 by wire bonding. The conductive wires 60 may be aluminum wires. The electric signal of the sensor element 40 is transmitted via the lead frames 50 to an external device capable of processing the electric signal of the sensor element 40.

Figure 3:
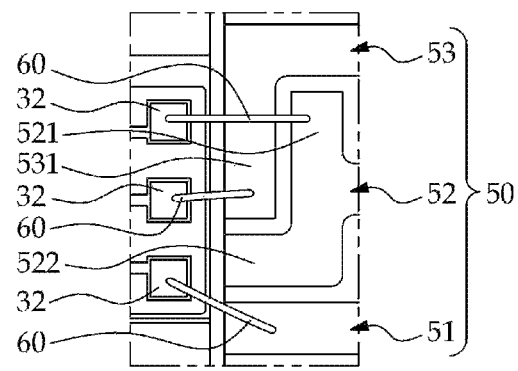
FIG. 3 is a view showing a portion of the differential pressure sensor shown in FIG. 1.
Figure 3:
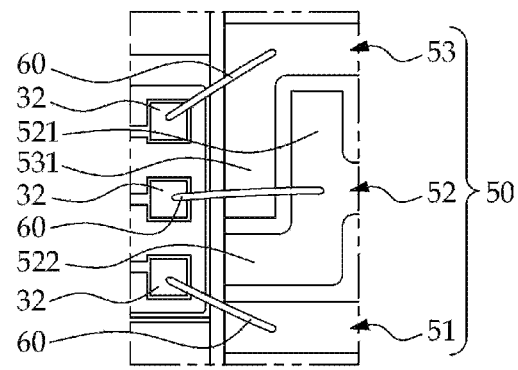

FIG. 3 is a view showing a portion of the differential pressure sensor shown in FIG. 1. As shown in FIG. 3, the lead frames 50 include a first lead frame 51, a second lead frame 52 and a third lead frame 53, which are electrically separated from each other. In this regard, the terminal-side end portions of the second lead frame 52 and the third lead frame 53 are configured to overlap with each other. More specifically, the third lead frame 53 includes a third frame extension portion 531 extending toward the second lead frame 52. The second lead frame 52 includes a second lead frame extension portion 521 extending parallel to the third frame extension portion 531 and extending toward the third lead frame 53. In addition, the end portion 522 of the second lead frame 52 opposite to the second lead frame extension portion 521 extends into a space between the second lead frame 52 and the first lead frame 51.

This configuration is to make sure that the conductive wires connecting the terminals 32 and the lead frames 50 do not cross each other regardless of the change in pin map. When the pin map is changed as shown in FIG. 3, by merely adjusting the length and the bonding positions of the conductive wires 60, it is possible to electrically connect the terminals 32 and the lead frames 50 with no crossing of the conductive wires.

As shown in FIG. 3A, when the first lead frame 51 is connected to the voltage input terminal and when the second lead frame 52 and the third lead frame 53 are respectively connected to the voltage output terminal and the ground terminal, the middle terminal of the terminals 32 of the substrate 30 is connected to the third frame extension portion 531 and the right terminal of the terminals 32 is connected to the second lead frame extension portion 521. Since the conductive wires 60 are connected to the overlapping one end portions, there is provided an advantage in that the conductive wires do not cross each other. If the conductive wires cross each other, a short circuit may occur. When the second lead frame 52 and the third lead frame 53 are respectively connected to the ground terminal and the voltage output terminal as shown in FIG. 3B, the middle terminal of the terminals 32 of the substrate 30 is connected to the second lead frame 52 and the right terminal of the terminals 32 is connected to the third lead frame 53 as in a typical connection method.

Referring again to FIGS. 1 and 2, the first sealing member 70 for sealing the body 20 is disposed in the region where the body 20 and the cover 21 make contact with each other. The first sealing member 70 may be made of a bonding agent. The first sealing member 70 is coated in a coupling groove 17 formed along the outer wall of the body 20. The first sealing member 70 has a substantially rectangular shape.

The second sealing member 80 is coated on a substantially rectangular groove 15 formed on the upper surface of the structure defining the sidewall of the second chamber 12, such as the partition wall 13 and the support portion 14 of the body 20. The second sealing member 80 serves to seal the second chamber 12 with respect to the first chamber 11.

Furthermore, a barrier 18 protruding toward the cover 21 is installed on the substrate 30 between the sensor element 40 and the terminals 32. The barrier 18 and the inner wall of the housing 10 define a region that surrounds the electronic components 31 of the substrate 30, the terminals 32, the conductive wires 60 and some portions of the lead frames 50. This region is filled with a filler 90 for protecting the electronic components 31, the terminals 32, the conductive wires 60 and the lead frames 50 from the exhaust gas. The filler 90 may be a fluoro silicone gel. The barrier 18 may be fitted to a guide 19 formed in the inner wall of the body 20.

Hereinafter, a method for assembling the differential pressure sensor configured as above will be described with reference to the drawings.

Figure 4:
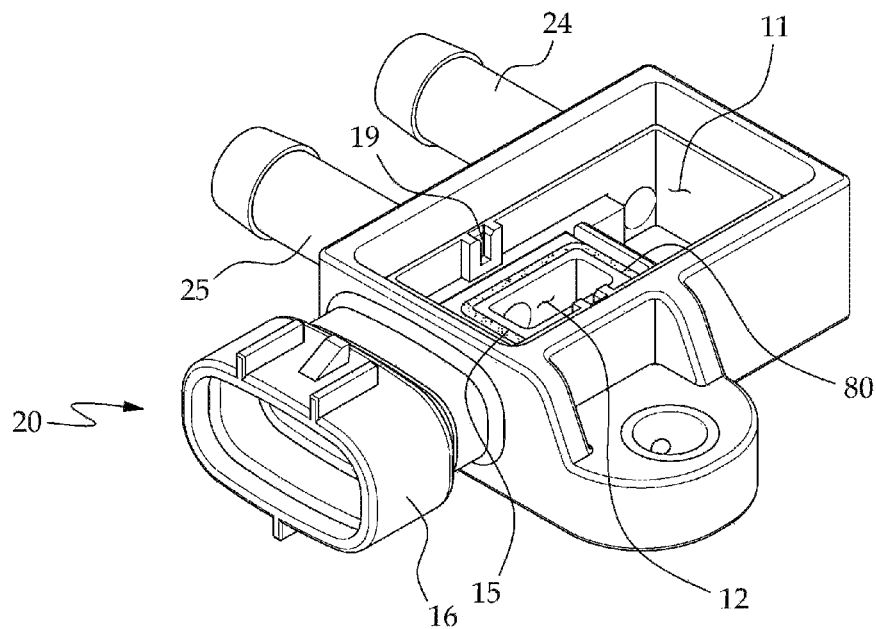
FIGS. 4 to 9 are views for explaining a method for assembling the differential pressure sensor shown in FIG. 1.

First, as shown in FIG. 4, the bonding agent constituting the second sealing member 80 is coated in the groove 15 defined by the partition wall 13 and the support portion 14 around the second chamber 12 of the body 20.

Figure 5:
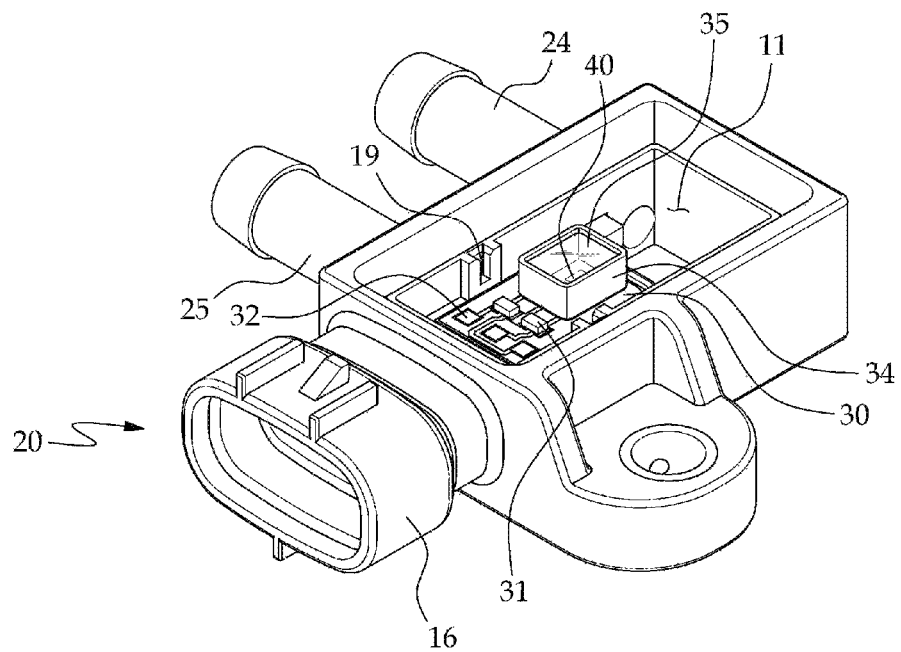

Next, as shown in FIG. 5, the open upper surface of the second chamber 12 is covered with the substrate 30 on which the sensor element 40 and the electronic components 31 are installed. The contact portion between the substrate 30 and the second chamber 12 is sealed by the second sealing member 80.

Figure 6:
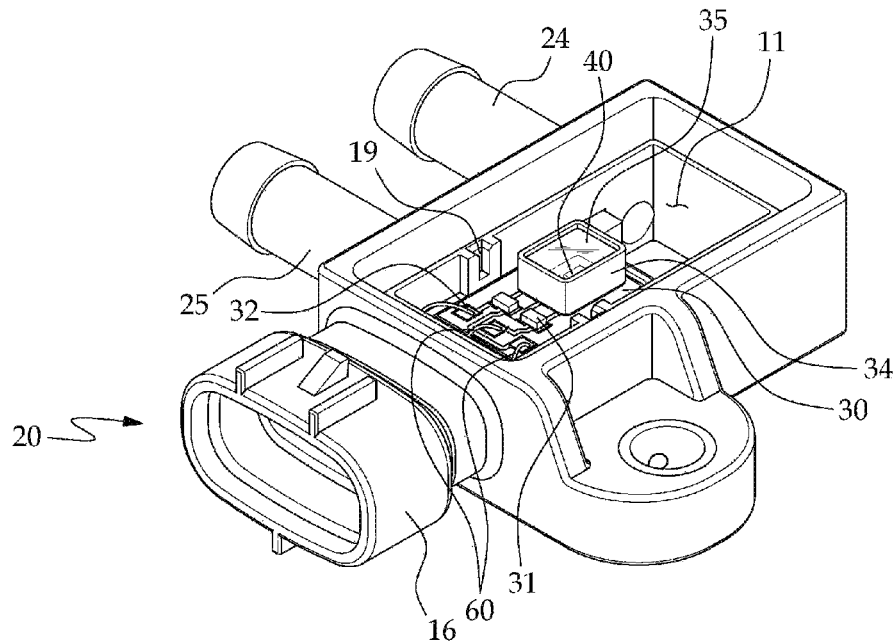

Then, as shown in FIG. 6, the terminals 32 of the substrate 30 and one end portions of the lead frames 50 are electrically connected to each other by wire bonding.

Figure 7:
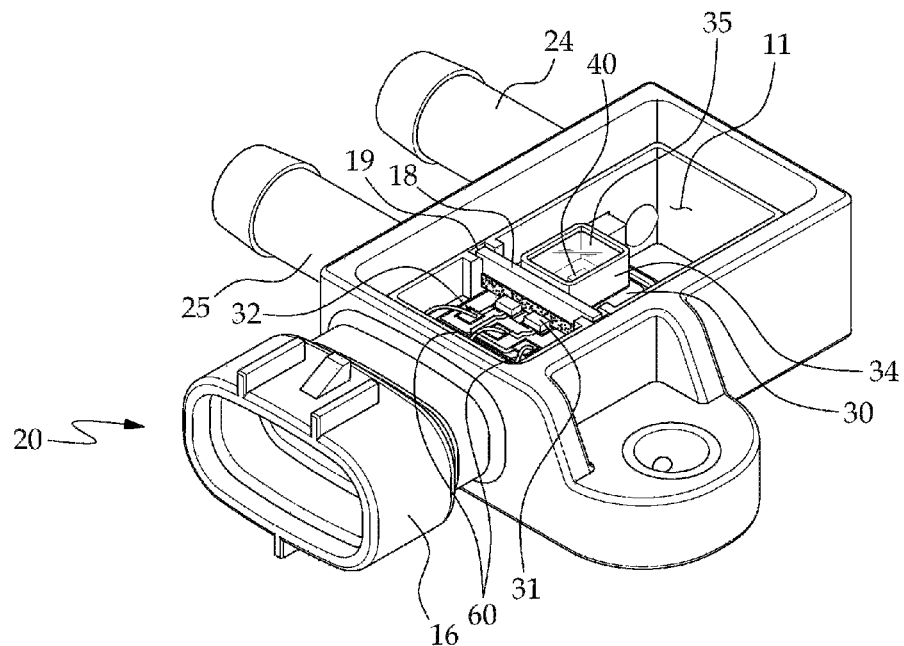

Subsequently, as shown in FIG. 7, the bonding agent is coated on the substrate 30. Thereafter, the barrier 18 is inserted into and fixed to the guide 19 formed in the inner wall of the body 20.

Figure 8:
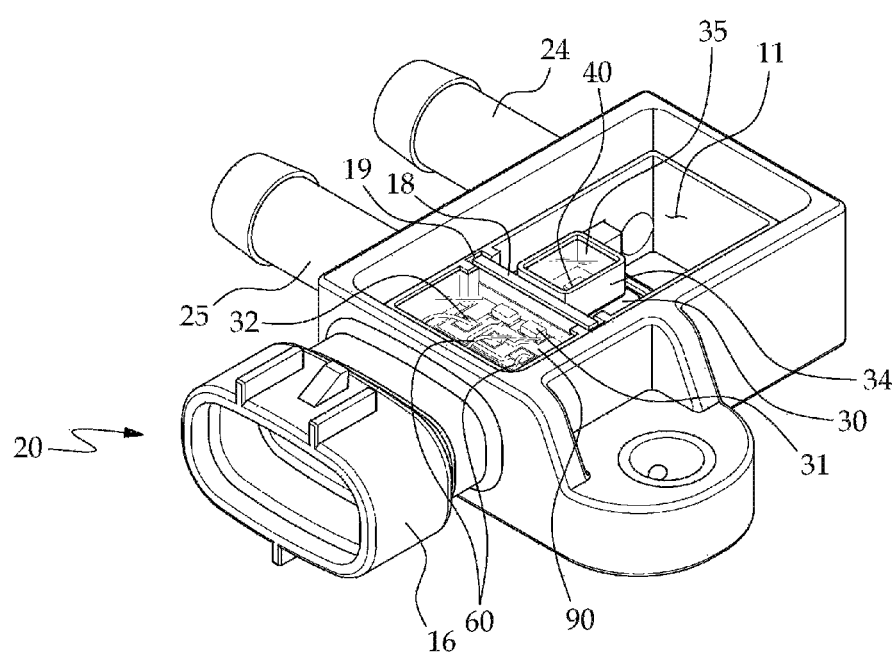

Then, as shown in FIG. 8, the filler 90 is filled in the space defined by the barrier 18 and the inner wall of the body 20.

Figure 9:
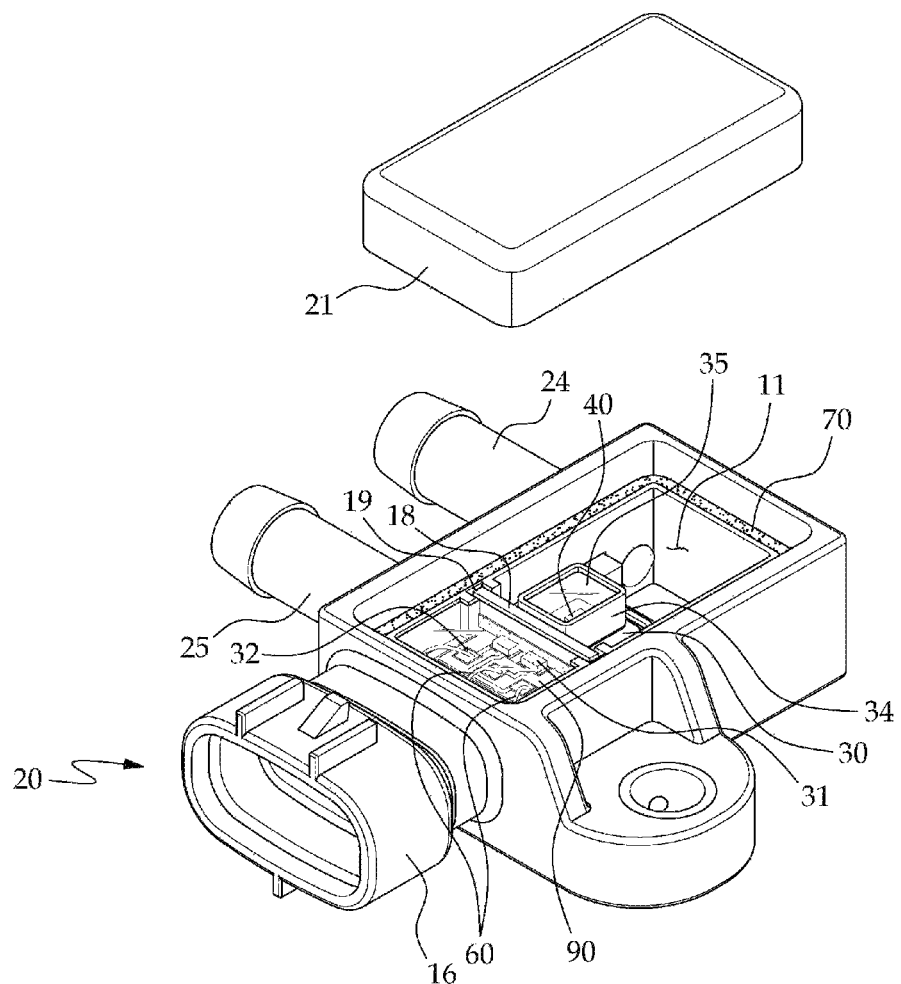

Finally, as shown in FIG. 9, the bonding agent constituting the first sealing member 70 is coated in the coupling groove 17 of the body 20. The cover 21 is coupled to the body 20, thereby sealing the upper portion of the body 20.

Hereinafter, the installation and operation of the differential pressure sensor will be described.

If the first pressure channel 24 is connected to the front end of the exhaust system post-treatment device and if the second pressure channel 25 is connected to the rear end of the exhaust system post-treatment device, the pressure of the second chamber 12 (the second pressure channel) is delivered to the lower portion of the sensor element 40 via the opening 33 of the substrate 30. The pressure of the first chamber 11 (the first pressure channel) is delivered to the upper portion of the sensor element 40 via the gel 35 covering the sensor element 40. The sensor element 40 generates an electric signal corresponding to the differential pressure. The electric signal is transmitted to the terminals 32 of the substrate 30 via the wiring lines of the substrate 30 and the electronic components 31. Then, the electric signal is transmitted to the lead frames 50 via the conductive wires 60 that electrically connects the terminals 32 and the lead frames 50. The electric signal transmitted to the lead frames 50 is transmitted to the external device connected to the connector portion 16 of the body 20. The external device measures the differential pressure and determines whether the exhaust system post-treatment device is abnormal.

The preferred embodiment described above is nothing more than one example and is not intended to limit the scope of the present invention. Those skilled in the art may make different changes, modifications or substitutions without departing from the spirit and scope of the present invention. It is to be understood that such changes, modifications or substitutions fall within the scope of the present invention.

[Description of Reference Numerals]

| | |
|---|---|
| 10: housing | 11: first chamber |
| 12: second chamber | 13: partition wall |
| 14: support portion | 15: groove |
| 16: connector portion | 17: coupling groove |
| 18: barrier | 19: guide |
| 20: body | 21: cover |
| 24: first pressure channel | 25: second pressure channel |
| 30: substrate | 31: electronic component |
| 32: terminal | 33: opening |
| 34: sensor element barrier | 35: gel |
| 40: sensor element | 50: lead frame |
| 51: first lead frame | 52: second lead frame |
| 53: third lead frame | 60: conductive wire |
| 70: first sealing member | 80: second sealing member |
| 90: filler | |

What is claimed is:

1. A differential pressure sensor, comprising:
a housing including a body and a cover, the housing having a first chamber and a second chamber defined in the housing and separated from each other;
a first pressure channel communicating with the first chamber;
a second pressure channel communicating with the second chamber;
a substrate on which an electronic component is mounted and on which a terminal is formed, the substrate including a first surface facing the first chamber and a second surface parallel to the first surface and facing the second chamber, the substrate configured to cover the second chamber;
a sensor element installed on the first surface of the substrate so as to generate an electric signal corresponding to a pressure difference between the first chamber and the second chamber;
a lead frame installed in the housing with one end thereof extending into the first chamber, the lead frame configured to transmit the electric signal of the sensor element to an external device;
a conductive wire configured to connect the terminal of the substrate and the lead frame so as to transmit the electric signal of the sensor element to the lead frame;
a first sealing member disposed in a region where the body and the cover make contact with each other, the first sealing member configured to seal the first chamber with respect to the outside; and
a second sealing member disposed in a region where the substrate and the body make contact with each other, the second sealing member configured to seal the second chamber with respect to the first chamber.

2. The sensor of claim 1, further comprising:
a filler configured to surround the electronic component and the terminal of the substrate and the conductive wire so as to protect the electronic component and the terminal of the substrate and the conductive wire.

3. The sensor of claim 2, wherein the filler has a gel state.

4. The sensor of claim 2, further comprising:
a barrier disposed between the sensor element and the terminal, the barrier protruding from the substrate toward the cover, the filler coated on a region surrounded by the barrier and an inner wall of the housing.

5. The sensor of claim 1, wherein the electronic component includes a multilayer ceramic capacitor, and the conductive wire is an aluminum wire.

6. The sensor of claim 1, wherein the substrate is a ceramic substrate.

7. The sensor of claim 1, wherein the lead frame includes a first lead frame, a second lead frame and a third lead frame electrically separated from each other, and one end portion of the second lead frame and one end portion of the third lead frame at least partially overlap with each other.

* * * * *